United States Patent
Korn et al.

(10) Patent No.: US 11,175,190 B2
(45) Date of Patent: Nov. 16, 2021

(54) DEVICE AND METHOD FOR THE IN-SITU CALIBRATION OF A THERMOMETER

(71) Applicant: Endress+Hauser Wetzer GmbH+Co. KG, Nesselwang (DE)

(72) Inventors: Michael Korn, Marktoberdorf (DE); Alfred Umkehrer, Hopferau (DE)

(73) Assignee: Endress+Hauser Wetzer GmbH+Co. KG, Nesselwang (DE)

(*) Notice: Subject to any disclaimer, the term of this patent is extended or adjusted under 35 U.S.C. 154(b) by 181 days.

(21) Appl. No.: 16/476,755

(22) PCT Filed: Oct. 30, 2017

(86) PCT No.: PCT/EP2017/077748
§ 371 (c)(1),
(2) Date: Jul. 9, 2019

(87) PCT Pub. No.: WO2018/127313
PCT Pub. Date: Jul. 12, 2018

(65) Prior Publication Data
US 2019/0360876 A1    Nov. 28, 2019

(30) Foreign Application Priority Data

Jan. 9, 2017   (DE) ..................... 10 2017 100 268.5

(51) Int. Cl.
*G01K 7/00* (2006.01)
*G01K 15/00* (2006.01)
*G01K 7/02* (2021.01)

(52) U.S. Cl.
CPC ............. *G01K 15/005* (2013.01); *G01K 7/02* (2013.01)

(58) Field of Classification Search
USPC ..................................... 374/179, 1, 183, 166
See application file for complete search history.

(56) References Cited

U.S. PATENT DOCUMENTS

| | | |
|---|---|---|
| 7,677,794 B2 | 3/2010 | Kim et al. |
| 8,840,301 B2 | 9/2014 | Hashemian |
| 2019/0360876 A1 | 11/2019 | Korn et al. |

FOREIGN PATENT DOCUMENTS

| | | |
|---|---|---|
| CN | 1228836 A | 9/1999 |
| CN | 102232203 A | 11/2011 |
| CN | 103154686 A | 6/2013 |

(Continued)

*Primary Examiner* — Mirellys Jagan
(74) *Attorney, Agent, or Firm* — Mark A. Logan; Endress+Hauser (USA) Holding Inc.

(57) ABSTRACT

The present disclosure relates to a device for determining a temperature of a liquid. The device comprises a first temperature sensor and a reference element. The reference element is composed of a material in which a phase transformation occurs at a predetermined temperature within a temperature range relevant for operation of the device. The material remains in the solid phase. Arranged on the reference element are a first and a second electrode electrically insulated from one another. The device includes a first connection line for contacting the first electrode, and a second connection line for contacting the second electrode. The device further includes a third connection line composed of a material different from the material of the first or the second connection line. The third connection line forms with the first or the second connection line the first temperature sensor in the form of a first thermocouple.

15 Claims, 3 Drawing Sheets

(56) References Cited

FOREIGN PATENT DOCUMENTS

| | | |
|---|---:|---|
| CN | 105387954 A | 3/2016 |
| DE | 4032092 A1 | 4/1992 |
| DE | 4032092 C2 | 6/1994 |
| DE | 19702140 A1 | 7/1998 |
| DE | 69130843 T2 | 6/1999 |
| DE | 19805184 A1 | 8/1999 |
| DE | 19941731 A1 | 3/2001 |
| DE | 69733138 T2 | 2/2006 |
| DE | 102004027072 B3 | 2/2006 |
| DE | 102010040039 A1 | 3/2012 |
| DE | 102014119593 A1 | 6/2016 |
| DE | 102015112425 A1 | 2/2017 |
| EP | 0775897 B1 | 2/2003 |
| EP | 1247268 B2 | 8/2009 |
| GB | 920097 A | 3/1963 |
| JP | 2012122862 A | 6/2012 |
| SU | 1236330 A1 | 6/1986 |
| WO | 2018127313 A1 | 7/2018 |

DEVICE AND METHOD FOR THE IN-SITU CALIBRATION OF A THERMOMETER

CROSS-REFERENCE TO RELATED APPLICATIONS

The present application is related to and claims the priority benefit of German Patent Application No. 10 2017 100 268.5, filed on Jan. 9, 2017 and International Patent Application No. PCT/EP2017/077748 filed on Oct. 30, 2017, the entire contents of which are incorporated herein by reference.

TECHNICAL FIELD

The invention relates to a device for determining and/or monitoring temperature of a liquid, comprising a first temperature sensor and a reference element and at least three connection lines. Furthermore, the present invention relates to a method for in-situ calibration and/or validation of a device of the invention.

BACKGROUND

The calibration of thermometers is currently usually performed in calibration baths, ovens or fixed point systems. A corresponding fixed point cell is described, for example, in DE102004027072B3. However, in the case of these methods, usually the thermometer must be deinstalled from the measuring point. In order, in contrast, to be able to calibrate a thermometer in the installed state, DE19941731A1 discloses a miniaturized fixed point cell provided in a thermometer. The fixed point cell is filled with a fixed point substance, e.g. a metal or a eutectic alloy. In this case, however, an additional cell is required for encapsulating the fixed point substance, which lessens the dynamic range of the sensor, especially deteriorates response time to a temperature change. Moreover, it can happen, in given cases, that the fixed point substance escapes from the cell, which can lead to damage or even destruction of the thermometer.

It would thus be desirable to be able to perform a calibration and/or validation of a thermometer in the installed state, thus in-situ, in the case of which the mentioned disadvantages would not occur.

In principle for determining a temperature, the most varied of physical and/or chemical, temperature dependent, material properties can be used. In such case, the property can be either a change, especially an abrupt change, of a particular property, occurring at a certain characteristic temperature point or a continuous change of a property in the form of a characteristic line or curve. For example, the Curie temperature of a ferromagnetic material is a characteristic temperature point for the material. In this regard, known from DE 4032092C2 is a method for ascertaining the Curie temperature, in the case of which by means of a differential scanning thermal analyzer an abrupt change of the absorbed amount of heat in the region of the Curie temperature is detected. In DE19702140A1, in turn, described are a device and a method for measuring the temperature of a rotating support part with a temperature sensor, which has a ferro- or paramagnetic material, which exhibits a temperature dependent change of its polarization in the temperature range of interest. Thus, a characteristic line or curve of temperature dependent polarization is taken into consideration for determining temperature.

A further example known from DE19805184A1 describes the ascertaining of temperature of a piezoelectric element based on its capacitance. Similarly, DE69130843T2 concerns a method and a device for determining temperature of a piezoelectric crystal oscillator.

The use of certain characteristic temperature points or characteristic line or curves is suited basically also for calibrating and/or validating thermometers.

Thus, in EP1247268B2, for example, a method for in-situ calibration of a plurality of integrated temperature sensors based on characteristic lines or curves of one or more reference elements in the form of secondary temperature sensors is described. The reference elements are installed in a thermometer insert supplementally to a primary temperature sensor. In order that a calibration can occur, the utilized reference elements differ from the primary temperature sensor with reference to construction and/or applied material. This results in different characteristic lines or curves. Disadvantageous in such case, however, is that the characteristic lines or curves of the reference elements are usually subject to aging effects and/or sensor drift.

For preventing such disadvantages, known from DE102010040039A1 are a device and a method for in-situ calibration of a thermometer having a temperature sensor and a reference element for calibrating the temperature sensor, in the case of which the reference element is composed at least partially of a ferroelectric material, which experiences a phase transformation at at least one predetermined temperature in the temperature range relevant for calibrating the temperature sensor. The calibration is thus performed based on the characteristic temperature point of a phase transformation of a ferroelectric material, thus based on a material-specific property. Depending on number of installed reference elements, in this way, both a so-called 1-point—as well as also a multipoint—calibration and/or validation can be performed. A similar device, especially suitable for multipoint calibrations, is, furthermore, known from the German patent application No. 102015112425.4, which was unpublished at the date of first filing of this application. The thermometer described there includes at least one temperature sensor and at least two reference elements contacted via exactly two connection wires. The reference elements are composed at least partially of two different materials, each of which has in the temperature range relevant for calibrating the temperature sensor at least one phase transformation at least of second order at, in each case, a predetermined phase transformation temperature. DE 102010040039A1 (U.S. Pat. No. 9,091,601) as well as DE 102015112425.4 (US 2018217010) are incorporated here by reference.

For applications of a corresponding device having a temperature sensor and an additional measuring element in an at least partially and/or at times, dynamic and/or inhomogeneous, thermal environment, it can happen that the temperature sensor and the reference element are not in thermal equilibrium. The temperature measured by means of the temperature sensor corresponds then at least at times not to a temperature of the reference element measured at the same time. This can lead disadvantageously to errors and/or inaccuracies in the case of a calibrating and/or validating the temperature sensor by means of the reference element.

SUMMARY

An object of the present invention is to provide a device for determining and/or monitoring temperature of a liquid with a high accuracy of measurement, as well as a method for its manufacture.

The object is achieved by a device for determining and/or monitoring temperature of a liquid as defined in claim 1 as well as by a method for in-situ calibration and/or validation of a device of the invention as defined in claim 12.

The device of the invention comprises a first temperature sensor for determining temperature of the liquid and a reference element for in-situ calibration and/or validation of the device, which reference element is composed at least partially of a material, in the case of which at least one phase transformation occurs at at least one predetermined phase transformation temperature within a temperature range relevant for operation of the device, in the case of which phase transformation the material remains in the solid phase. The device includes at least a first connection line for, especially electrical, contacting of at least a first component of the reference element and a second connection line for, especially electrical, contacting of at least a second component of the reference element. Furthermore, at least a third connection line is provided, which is composed of a material, which differs at least from the material of the first or the second connection line. This third connection line is, furthermore, arranged in such a manner that it forms with the first or the second connection line the first temperature sensor in the form of a first thermocouple. The thermometer of the invention is advantageously embodied for an in-situ calibration and/or validation of at least the first temperature sensor. For this, the temperature sensor (primary sensor) is calibrated and/or validated using a secondary sensor (reference element).

In the case of a phase transformation in a material, which remains in the solid phase, involved, for example, according to the Ehrenfest classification, is a phase transformation at least of second order. In contrast to a phase transformation of first order, no or only a negligible amount of latent heat is released during the phase transformation. When no or only a negligible amount of latent heat is released, it can—basically and independently of the selected classification for phase transformations—, among other things, be advantageously assured that the temperature measured by means of the temperature sensor at the point in time of the occurrence of a phase transformation, is not corrupted, especially not by released, latent heat.

In an additional classification of phase transformations significantly more usual in the present state of the art, it is distinguished only between discontinuous (first order) and continuous (second order) phase transformations [compare e.g. Lexikon der Physik, Spektrum Akademischer Verlag, Heidelberg, Berlin, Vol. 4, under the entry "Phasenübergänge und andere kritische Phänomene" (Phase Transformations and Other Critical Phenomena)]. According to this classification, various ferroelectric materials can be associated with both phase transformations of first as well as also second order, wherein in both cases the particular material, for which a phase transformation occurs, remains in the solid phase during the phase transformation.

A phase transformation includes a discontinuity in the second derivative of a thermodynamic variable, such as, for example, the pressure, the volume, the enthalpy, or the entropy as a function, for example, of temperature. Usually, phase transformations involve the change of a certain specific material property, for example, alternation in the crystal structure, or alternation in the magnetic, electrical or dielectric properties. These material-specific changes are known for the particular reference element and can be taken into consideration for a calibration and/or validation of a temperature sensor. In such case, the at least one reference element can have one or more phase transformations, especially phase transformations in the solid phase of the utilized material. Each phase transformation occurs at a certain characteristic, fixed and long term stable, temperature value, so that, in principle, no drift and/or no aging effects need to be taken into consideration for the reference element.

At least the first thermocouple of the invention forming the first temperature sensor is arranged in the direct vicinity of the reference element. The connection lines forming the first thermocouple are correspondingly of different materials. The operation of a thermocouple is sufficiently known to those skilled in the art and is therefore not explained in detail here. Temperature is determined by means of a thermocouple from a thermovoltage arising between two thermocouple wires composed of different materials. For the device of the invention, these are given by two connection lines. The two thermowires are, for this, connected together at a site, referenced in the following as measuring point, where the temperature is to be determined. The thermocouple is especially a thermocouple according to DIN standard IES584, for example, a thermocouple of type K, J, N, S, R, B, T, or E. However, also other material pairs, for example, such, which have a measurable Seebeck effect, are possible and fall within the scope of the present invention.

Advantageously, the device of the invention is distinguished by an especially compact construction, or by an especially simple structural construction. The reference element and the temperature sensor are advantageously arranged close together. This permits an especially exact calibration and/or validation of at least the first temperature sensor. Especially for applications in an at least partially and/or at times dynamic and/or inhomogeneous thermal environment, it is assured that the temperature sensor and the reference element are at any time essentially in thermal equilibrium. Temperature differences, especially time limited temperature differences, for different positions within the sensor head brought about by an inhomogeneous heat flow, such as, for example, in the case of applications in a flowing liquid, especially liquid flowing in a pipe or tube, can essentially be prevented. If at a certain point in time the occurrence of a phase transformation within the reference element is detected, a temperature measured essentially at the same point in time by means of the temperature sensor corresponds essentially to the phase transformation temperature. Thus, the device of the invention assures a high accuracy of measurement as well as an especially high accuracy in the case of a calibration and/or validation of the temperature sensor.

An embodiment provides that there are arranged on the reference element at least a first and a second electrically conductive electrode, which first and second electrodes are electrically insulated from one another, and wherein the first connection line contacts, especially electrically contacts, the first electrode, and wherein the second connection line contacts, especially electrically contacts, the second electrode. The electrodes are preferably applied on and along the surface of the reference element. Suited for accomplishing this is, for example, a sputter- or thick film process. Alternatively, the two electrodes can also be embodied in the form of two electrically conductive platelets, between which the reference element is arranged. In the case of an embodiment of the reference element as a body with a plurality of surface areas, for example, in the form of a cuboid, the at least two electrodes can, in such case, be arranged either in the region of the same surface area or in the region of different surface areas. The reference element is, furthermore, contacted, especially electrically contacted, via at least two connection lines, in each case, contacting one of the at least two electrodes. In such case, the materials, of which the at least two electrodes and/or the connection lines are composed can, in each case, be, for all these components or for a portion of the components, in each case, the same as well as also different.

In an advantageous embodiment of the device of the invention, the at least one material, of which the reference element is composed at least partially, is a ferroelectric material, a ferromagnetic material, or a superconducting material, especially a high temperature superconductor.

Another embodiment provides that the at least one material, of which the reference element is composed, is, at least partially, an alloy, especially LiNbO3, NaNbO3, KNO3, Pb(0.5Sc0.5Nb)O3, Pb(0.33Mg0.67Nb)O3, Pb(0.33Zn0.67Nb)O3, LiTaO3, PbTa2O6, Pb(0.5Fe0.5Ta)O3, SrBi2Ta2O9, Sm(MoO4)3, Eu2(MoO4)3, Pb5GeO11, SrTeO3, PbZrO3-PbTiO3, BaTiO3, or a solid solution, for example, BaTiO3-PbTiO3.

In an especially preferred embodiment, the third connection line is arranged in such a manner that it is electrically contacted with the first or second electrode. The first thermocouple is thus formed from the first and third or from the second and third connection lines, wherein the two connection lines forming the first thermocouple are connected together in the region of one of the electrodes of the reference element. The measuring point is located thus directly on the reference element, or on an electrode of the reference element. Correspondingly, the temperature sensor can essentially determine the temperature of the reference element, especially the temperature in the region of one of the electrodes and/or a surface of the reference element. The temperature ascertained by means of the temperature sensor corresponds thus at any time essentially to the temperature of the reference element.

In an additional, preferred embodiment, a fourth connection line is provided, which is composed of a material, which differs at least from the material of the first or the second connection line, wherein the fourth connection line, when the third connection line contacts the first electrode, contacts, especially electrically contacts, the second electrode, and when the third connection line contacts the second electrode, contacts, especially electrically contacts, the first electrode. The two connection lines contacting, especially electrically contacting, the same electrode form then the first temperature sensor in the form of the first thermocouple and a second temperature sensor in the form of a second thermocouple.

Involved in the case of this embodiment is a double-thermocouple, by means of which, for example, a redundant temperature registration is possible. This embodiment is especially preferred for applications at high temperatures, especially T>300° C. In this case, as a result of the measuring principle underpinning a thermocouple, a drift can be experienced in the temperature determination. The thermovoltage is namely produced over the entire length of the thermowires, wherein regions of the thermowires, in which a comparatively great temperature gradient per unit length occurs, make an especially large contribution to the thermovoltage. This influence can be minimized by a redundant temperature registration.

Preferably, a device of the invention with two temperature sensors can be a so-called double-sheathed thermocouple. The four connection lines forming the two thermocouples and the two, especially electrical, contacts of the at least two electrodes of the reference element are then led in the same sheathed cable. This enables an especially compact and cost effective construction.

Another embodiment of the invention includes that at least a third temperature sensor is provided having at least a fifth connection line for electrical contacting of the third temperature sensor, which third temperature sensor serves for determining temperature of the liquid. This third temperature sensor likewise enables a redundant temperature registration. In contrast to the first and, in given cases, second temperature sensor formed by the first and, in given cases, second thermocouples, the third temperature sensor does not absolutely have to be a thermocouple. Rather, all imaginable temperature sensors known to those skilled in the art are possible. Preferably, the third temperature sensor is, however, a resistance element, for example, a resistance element composed at least partially of platinum. The resistance element is preferably embodied in the form of a thin layer or coating and, for example, applied directly on a portion of the reference element or on a substrate. The third temperature sensor can, in such case, basically be arranged either separated from the reference element or in direct contact with the reference element.

Advantageously, the third temperature sensor and the at least one reference element are arranged in a single sensor head.

It is likewise advantageous that the third connection line is embodied as a connecting line, which contacts, especially electrically contacts, one of the two electrodes and the third temperature sensor. This enables an especially simple, especially electrical, contacting of temperature sensors and the reference element. In such case, it is especially advantageous that the third connection line be composed of the same material as the fifth, first, or second, connection line.

The object of the present invention is achieved, furthermore, by a method for in-situ calibration and/or validation of a device of the invention. In such case, the method of the invention includes steps as follows:

ascertaining at least one phase transformation point in time, at which at least one phase transformation temperature of the reference element is achieved, ascertaining a first temperature measured value measured by means of the first temperature sensor at a first measuring point in time, which has the shortest time separation from the phase transformation point in time, and calibrating and/or validating the first temperature sensor based on a comparison of the at least one phase transformation temperature with the first temperature measured value.

Of course, in the case, in which the reference element has more than one phase transformation and/or when more than one reference element is provided, the method of the invention is applicable analogously also for the additional phase transformations with the additional characteristic phase transformation temperatures. In this case, a reconciliation of the characteristic line or curve of at least the first temperature sensor can occur over broad temperature ranges, especially over sections with different slopes in the characteristic curve.

In an advantageous embodiment, which applies especially for the case, in which the device of the invention has four connection lines, the method includes steps as follows:

ascertaining a second temperature measured value measured by means of the second temperature sensor at a second measuring point in time, which has the shortest time separation from the phase transformation point in time, calibrating and/or validating the second temperature sensor based on a comparison of the at least one phase transformation temperature with the first and/or second temperature measured value, and determining temperature of the liquid based on the first and/or second temperature measured value or based on an average value of the first and second temperature measured values.

In an additional, advantageous embodiment of the method, which is especially suitable for a device of the invention having at least a third temperature sensor, the method includes steps as follows:

ascertaining a third temperature measured value measured by means of the third temperature sensor at a third measuring point in time, which has the shortest time separation from the phase transformation point in time, calibrating and/or validating the third temperature sensor based on a comparison of the at least one phase transformation temperature with the first, second and/or third temperature measured value, and determining temperature of the liquid based on the first, second and/or third temperature measured value or based on an average value of the first, second and/or third temperature measured value.

In the case of this embodiment, it is advantageous that, for calibrating and/or validating the third temperature sensor based on a comparison of the at least one phase transformation temperature with the third temperature measured value, a difference existing, in given cases, between the first and/or second temperature measured value measured by means of the first and/or second temperature sensor is taken into consideration.

The embodiments explained in connection with the device can be applied mutatis mutandis also for the proposed method and vice versa.

BRIEF DESCRIPTION OF THE DRAWINGS

The invention will now be explained in greater detail based on the appended drawing. Equal elements of the device are provided with equal reference characters. The figures of the drawing show as follows.

DETAILED DESCRIPTION

Figure 1:
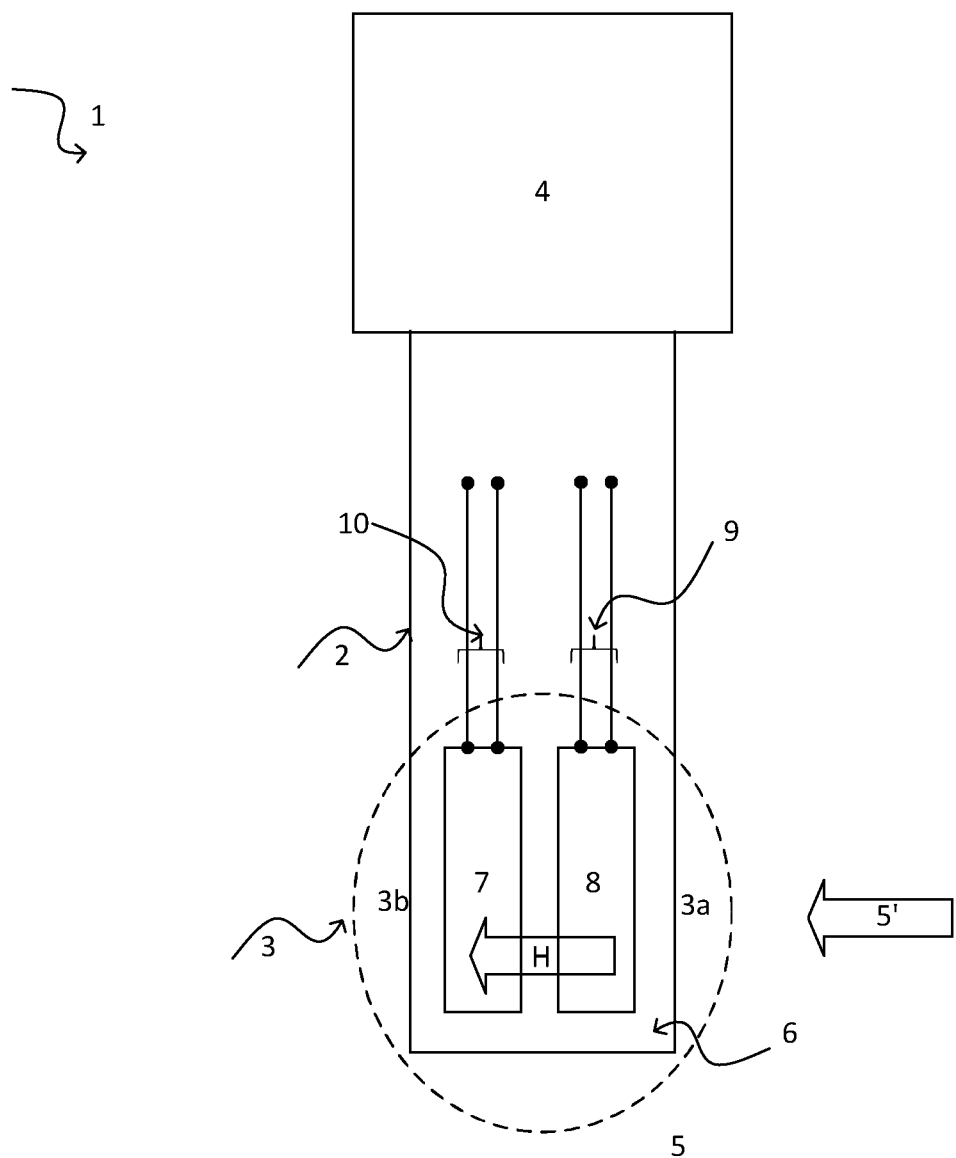
FIG. 1 shows a schematic representation of a thermometer having a temperature sensor and a separately contacted reference element for determining and/or monitoring temperature of a flowing liquid according to the state of the art.

FIG. 1 is a schematic view of a thermometer 1 with a protective tube 2 and an electronics unit 4 according to the state of the art. The portion of the protective tube 2 facing the liquid 5 is also referred to as the sensor head 3. The internal volume of the sensor head 3 is filled with a filler 6, especially an electrically insulating filler 6, especially a cement. Furthermore, arranged in the interior of the sensor head 3 are a temperature sensor 7 and a reference element 8, each of which is contacted, especially electrically contacted, by means of two connection wires, 9,10 and connected with the electronics unit 4. Temperature sensor 7 is, for example, a resistance element or a thermocouple. Reference element 8 is, in turn, composed at least partially of a material, in the case of which at least one phase transformation at least of second order occurs at at least one predetermined phase transformation temperature within the temperature range relevant for operation of the device. The number of needed connection wires 9,10 for contacting the reference element and the temperature sensor 7,8 can vary, depending on type of applied measuring principle. In the illustrated embodiment, the temperature sensor 7 and the reference element 8 are arranged mutually spaced within the sensor head 3. They can, however, likewise directly contact one another and, for example, be soldered together.

For purposes of a high accuracy of measurement, it must be assured that the temperature sensor and the reference element are in the ideal case at any time in thermal equilibrium. In order to achieve this, different measures are usually performed, of which some are listed in the following, by way of example:

1. Temperature sensor 7 and reference element 8 are arranged within the sensor head 3 symmetrically, especially symmetrically with respect to an imaginary axis extending in the longitudinal direction of the protective tube 2 through a center of the protective tube 2.
2. Temperature sensor 7 and reference element 8 are thermally coupled (e.g. soldered together) as well as possible.
3. Support substrates in given cases applied for the temperature sensor 7 and/or the reference element 8 have essentially the same thermal conductivity.
4. Temperature sensor 7 and reference element 8 are embodied in such a manner that they have essentially the same thermal capacitance.
5. Filler 6 and/or partitions [not shown] arranged in the region of the sensor head 3 are formed in such a manner that they assure an isotropic and/or homogeneous heat flow within the sensor head 3.
6. All components of at least the sensor head 3 are embodied in such a manner that they have a best possible thermal conductivity.

Even with greatest care with reference to the manufacture of a thermometer 1 having at least two measuring elements 7,8 arranged in a single sensor head 3, however, different cases can occur, in which the temperature sensor 7 and the reference element 8 are, at least at times, not in thermal equilibrium and correspondingly are exposed to different temperatures. This can, in turn, lead to considerable errors and/or measurement inaccuracies in the case of a calibration and/or validation of a temperature sensor by means of the reference element.

An example is use of the thermometer 1 in an at least at times and/or partially dynamic and/or inhomogeneous, thermal environment, such as, for example, for a flowing liquid 5'.

A temperature change of the flowing liquid 5' from a first temperature $T_1$ to a second temperature $T_2$ leads to an asymmetric heat flow H within the sensor head 3. A portion 3a of the sensor head 3 facing upstream against the flow direction of the liquid 5 reaches the second temperature $T_2$ at an earlier point in time than a portion 3b of the sensor head 3 facing downstream in the flow direction of the liquid 5. Thus, the reference element 8 reaches the second temperature $T_2$ at an earlier point in time than the temperature sensor 7.

In the case of use of the thermometer 1 in a steady thermal environment, in contrast, the heat flow H would start from the surface of the sensor head 3 facing the liquid 5 and move into the interior of the sensor head 3. However, in the context of the present invention, the terminology, heat flow H, includes in this connection both a heat flux from the liquid 5 into the sensor head 3, corresponding to the case, in which the liquid 5 has a higher temperature than the sensor head 3, as well as also in the reverse direction, in which case, in which the sensor head 3 has a higher temperature.

These problems illustrated by way of example and the errors associated therewith resulting for a calibration and/or validation of a temperature sensor 7 by means of the reference element 8 can be prevented by means of the present invention. In this regard, three advantageous embodiments of the present invention are explained in the following, by way of example, based on FIGS. 2-4. These embodiments are combinable to the extent desired. Furthermore, besides the embodiments shown here, many other embodiments are possible, which likewise fall within the scope of the present invention.

Figure 2:
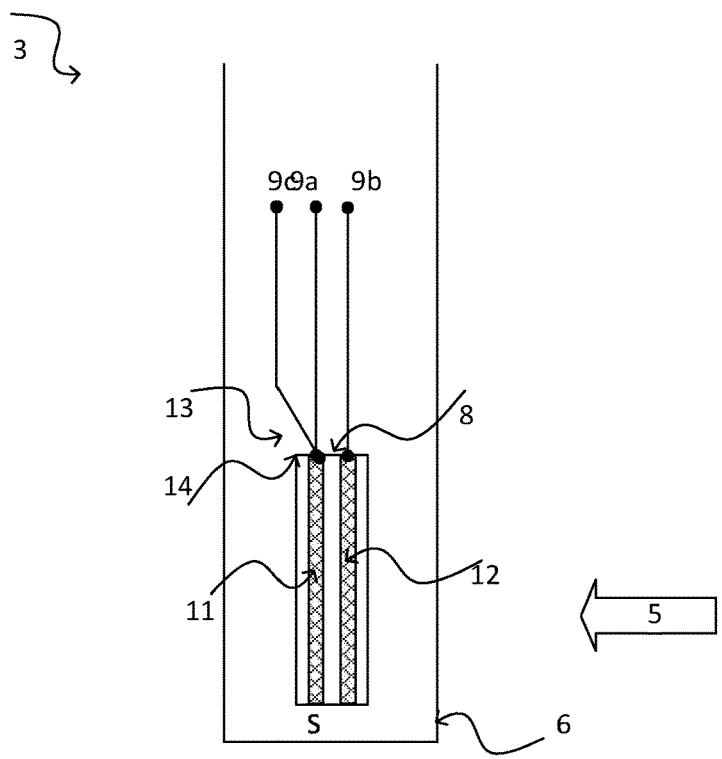
FIG. 2 shows a first embodiment of a device of the present disclosure with a temperature sensor of the present disclosure and a reference element.

FIG. 2 shows a first embodiment of a thermometer 1 of the invention. Shown is the sensor head 3 filled with the filler 6, within which a reference element 8 is arranged. Arranged on the reference element 8 are at least a first 11 and a second 12 electrically conductive electrode. The two electrodes 11,12 are arranged here in the region of the surface S of the reference element 8 on the same surface area and electrically insulated from one another. In another embodiment, the two electrodes 11, 12 can, however, as well be arranged in the regions of different surface areas. A first connection wire 9a serves for contacting, especially electrical contacting, of the first electrode 11 and a second connection wire 9b serves for electrical contacting of the second electrode 12. The first electrode 11 is, furthermore, contacted, especially electrically contacted, by a third connection line 9c. The first 9a and the third 9c connection lines are, in such case, of different materials and form a first temperature sensor 13 of the invention in the form of a first thermocouple. By means of the first temperature sensor 13, the temperature reigning within the sensor head 3 at the site of the reference element 8 is ascertainable at any time. Reference element 8 and the first temperature sensor 13 are thus located at all times advantageously in thermal equilibrium.

Alternatively, the first temperature sensor can in analogous manner also be formed by the second 9b and third 9c connection lines. Furthermore, it is not absolutely necessary that the measuring point 14 of a temperature sensor be located directly on a contacted electrode 11,12. It should, however, ideally be located at least in the immediate vicinity of the reference element 8.

Figure 3:
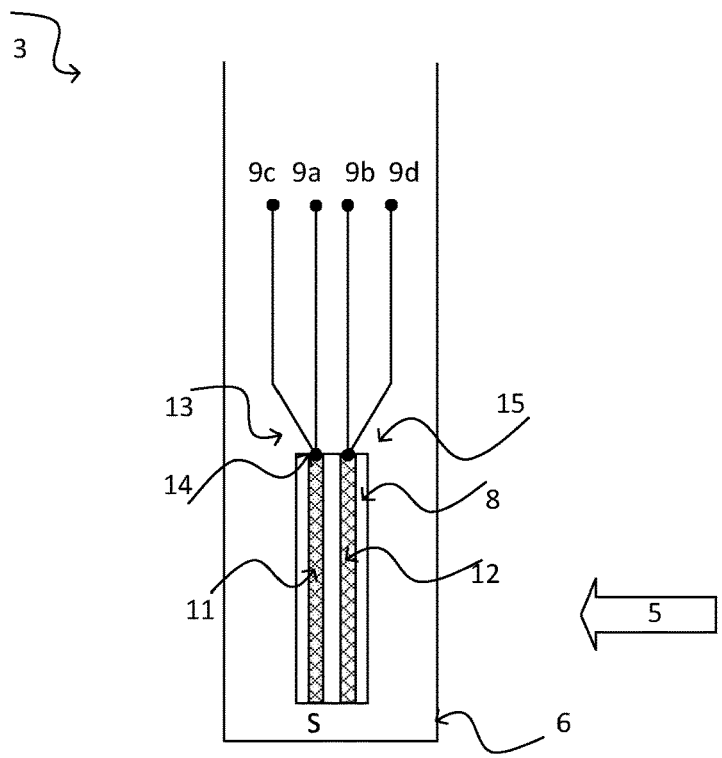
FIG. 3 shows a second embodiment of a device of the present disclosure with two temperature sensors of the present disclosure and a reference element.

A second embodiment is shown in FIG. 3. In this case, the device of the invention includes, supplementally to the embodiment of FIG. 2, a fourth connection wire 9d, which in this embodiment, as in the case of the second connection line 9b, also contacts, especially electrically contacts, the second electrode 12. The first 9a and the third 9c connection lines form thus, such as previously, the first temperature sensor 13 in the form of a first thermocouple, and the second 9b and fourth 9d connection lines form a second temperature sensor 15 of the invention in the form of a second thermocouple. Of course, the connection lines 9a-9d, in their forming of thermocouples, are permutable as much as desired. However, each two connection lines 9a-9d forming a thermocouple should be of different materials. This holds analogously and independently of the embodiment of FIG. 3 for embodiments comprising more than four connection lines 9a-9d.

Figure 4:
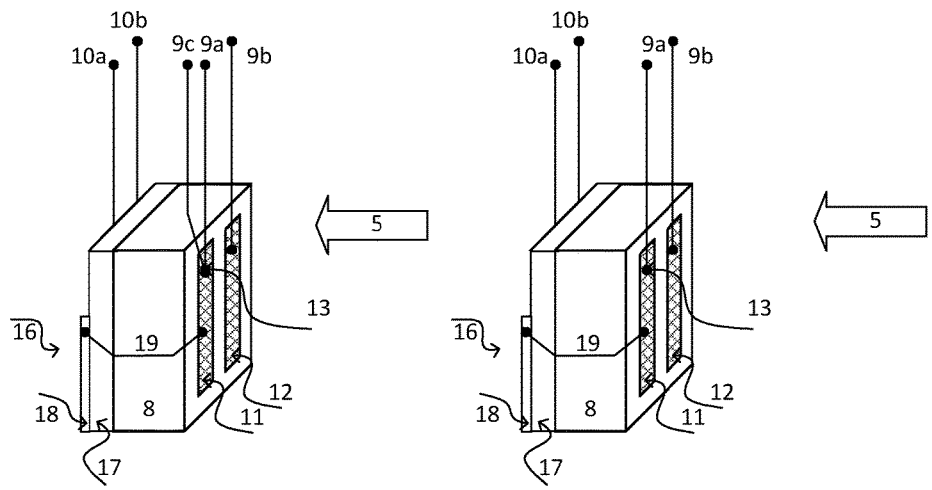
FIG. 4 shows a third embodiment of a device of the present disclosure with two temperature sensors of the present disclosure and a reference element.

Two variants of an embodiment with a third temperature sensor 16 are, finally, shown in FIG. 4. For purposes of simplification, the sensor head 3 with the filler is not shown in this embodiment. The third temperature sensor 16 in the embodiment shown here is a resistance element 18 arranged on a substrate 17, especially a so-called PT100- or PT1000- element. The resistance element is contacted, especially electrically contacted, by means of a fifth 10a and a sixth 10b connection line. A limiting of the number of connection lines 10a, 10b to two for contacting the third temperature sensor 16 is not absolutely necessary. Rather, it depends on the type of temperature sensor and particular construction of the device 1 and is correspondingly variable.

The third temperature sensor 16 is arranged in direct contact with the reference element 8 for the embodiment of FIG. 4a, but this is likewise not absolutely necessary. Similarly such as shown in the embodiment of FIG. 2, the reference element 8 of FIG. 4a includes two electrodes 11, 12, which are contacted by a first 9a and second 9b connection line. The first connection line 9a forms by means of the third connection line 9c the first temperature sensor 13 in the form of a first thermocouple.

For the shown embodiment, it is expedient to ascertain the temperature by means of the third temperature sensor 16, since resistance elements have, as a rule, compared with thermocouples, a significantly lower measurement uncertainty. The first temperature sensor 13, which is exposed to essentially the same temperature as that of the reference element 8, serves then, for example, for determining a dynamic temperature difference $\Delta T_{dyn}$, which can occur between the third temperature sensor 16 and the reference element 8 especially in an at least partially and/or timewise dynamic and/or thermal environment. For this, optionally a connecting line 19 can be integrated between the third temperature sensor 16 and that of the two electrodes 11, which is contacted by at least one connection wire—here 9a and 9c—forming the first thermocouple.

A similar embodiment of a form of the invention is subject matter of FIG. 4b. Already explained elements are not explained anew. In contrast to the embodiment of FIG. 4a, in FIG. 4b, the third connection line 9c is not separate [and, because of that not shown here], but, instead embodied as a connecting line 19. Advantageously, except for the connection lines 9a,9b and 10a,10b, no other connection line is required from the third temperature sensor 16 or the reference element 8 to the electronics unit 4. Furthermore, in the embodiment of FIG. 4b, the dynamic temperature difference $\Delta T_{dyn}$ can be directly determined based on the thermovoltage arising between the first connection line 9a and the fifth connection line 10a.

Also, for embodiments as shown in FIG. 4, permutations of the connection lines 9a-9c, 10a,10b,19 are possible, wherein it must be assured that, in each case, both connection lines 9a-9c, 10a,10b,19 forming a thermocouple are of different materials, or alloys. At least the third connection line 9c embodied as a connecting line 19 must be of another material than the other connection lines 9a,9b, 10a,10b.

Reference element 8 is, without limitation of the generality of the embodiments shown in FIGS. 2-4, embodied in the form of a capacitor element. During ex- or subceeding of the phase transformation temperature, a jump-like change of the capacitance C of the reference element 8 occurs, which is detectable via the two connection lines 9a, 9b.

Figure 5:
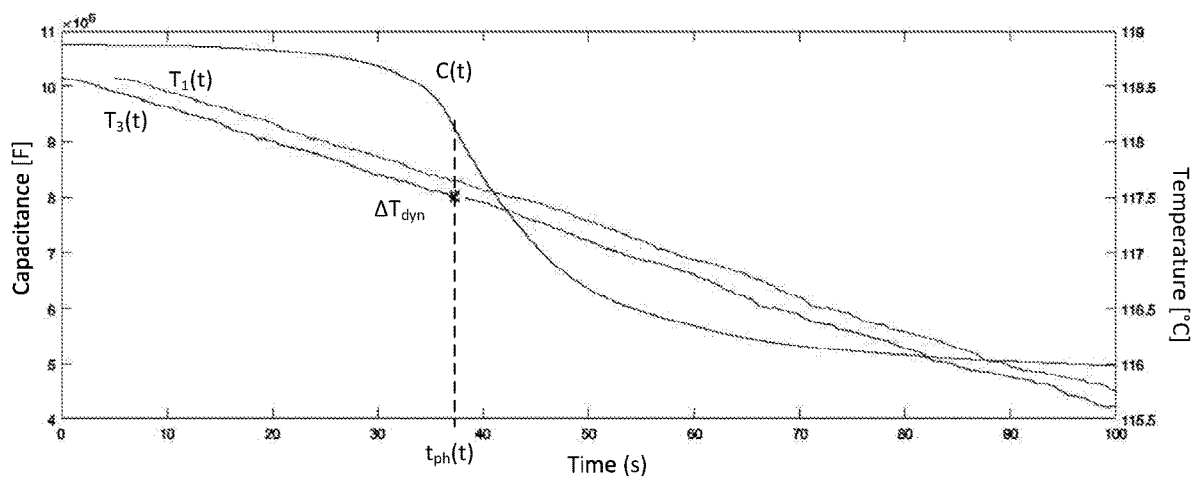
FIG. 5 shows an illustration of a temperature determination, or a calibration and/or validation, based on a device of FIG. 4.

For illustrating a temperature determination, or a calibration and/or validation, based on a device of FIG. 4, FIG. 5 shows the temperature $T_1(t)$ ascertained by means of the first temperature sensor 13, the temperature $T_3(t)$ ascertained by means of the third temperature sensor and the capacitance C(t) registered by means of the reference element, in each case, as a function of time. At the point in time $t_{ph}$, a phase transformation occurs within the reference element 8 at the phase transformation temperature $T_{ph}$. At this point in time, $T_1(t_{ph}) > T_3(t_{ph})$, since the first temperature sensor 13 is located directly on the reference element 8. For a liquid 5 flowing in the opposite direction, these considerations apply analogously. For determining the temperature, different options are available: On the one hand, the average value of the temperatures measured by means of the first 13 and third 16 temperature sensors can be formed. On the other hand, the temperature difference $\Delta T_{dyn} = T_1(t_{ph}) - T_2(t_{ph})$ can be formed, and subtracted from the temperature $T_3(t)$ measured by means of the third temperature sensor 16.

In summary, a device of the invention includes the following advantages: Reference element 8 and at least the first temperature sensor 13, or the first 13 and second 15 temperature sensors are, in each case, arranged in the direct vicinity of the reference element and essentially in thermal equilibrium at any time. A thermocouple is distinguished, furthermore, by a very low mass, so that any influence on the thermodynamic behavior of the sensor head 3 by a temperature sensor 13, 15 embodied in the form of a thermocouple is minimal. The invention is distinguished by an especially simple construction with at least three connection lines 9a-9c. Also, in the case of integration of a third temperature sensor 16 of another type, especially in the form of a resistance element, negative influences on the measurement inaccuracy, especially in an at least at times and/or partially dynamic and/or inhomogeneous thermal environment, can be eliminated.

LIST OF REFERENCE CHARACTERS 1 thermometer insert
2 protective tube
3 sensor head
4 electronics unit
5 liquid
6 filler
7 temperature sensor
8 reference element
9, 9a-9d connection lines of the reference element
10 connection lines of temperature sensor
11 first electrode
12 second electrode
13 first temperature sensor
14 measuring point
15 second temperature sensor
16 third temperature sensor
17 substrate
18 resistance element
19 connecting line
S surface of the reference element
H heat flow within the sensor head
T, $T_1$, $T_2$, $T_3$ first, second, third temperature
C capacitance of the reference element
$T_{ph}$ phase transformation temperature
$t_{ph}$ phase transformation point in time
t time
$\Delta T_{dyn}$ dynamic temperature difference between the first and second temperature sensors

The invention claimed is:

1. A device for determining a temperature of a liquid, comprising:
a first temperature sensor for determining a temperature of the liquid;
a reference element for in-situ calibration of the device, wherein the reference element is composed at least partially of a material in which a phase transformation occurs at a predetermined phase transformation temperature within a temperature range relevant for operation of the device, wherein during the phase transformation the material remains in a solid phase;
a first connection line for electrical contacting of a first component of the reference element;
a second connection line for electrical contacting of a second component of the reference element; and
a third connection line composed of a material which differs from the material of the first or the second connection line,
wherein the third connection line is arranged such that it forms with the first or the second connection line the first temperature sensor in the form of a first thermocouple.

2. The device as claimed in claim 1,
wherein the material of which the reference element is at least partially composed is a ferroelectric material, a ferromagnetic material, a superconducting material, or a high temperature superconductor.

3. The device as claimed in claim 1,
wherein the material of which the reference element is at least partially composed is an alloy including one of LiNbO3, NaNbO3, KNO3, Pb(0.5Sc0.5Nb)O3, Pb(0.33Mg0.67Nb)O3, Pb(0.33Zn0.67Nb)O3, LiTaO3, PbTa2O6, Pb(0.5Fe0.5Ta)O3, SrBi2Ta2O9, Sm(MoO4)3, Eu2(MoO4)3, Pb5GeO11, SrTeO3, PbZrO3-PbTiO3, and BaTiO3, or is a solid solution including BaTiO3-PbTiO3.

4. The device as claimed in claim 1, further comprising:
a first and a second electrically conductive electrode, wherein the first and the second electrodes are arranged on the reference element and are electrically insulated from one another, and wherein the first connection line electrically contacts the first electrode, and wherein the second connection line electrically contacts the second electrode.

5. The device as claimed in claim 4,
wherein the third connection line is arranged such that it is electrically contacted with the first or second electrode.

6. The device as claimed in claim 5, further comprising:
a fourth connection line composed of a material which differs from the material of the first or the second connection line,
wherein the fourth connection line, when the third connection line electrically contacts the first electrode, electrically contacts the second electrode, and when the third connection line electrically contacts the second electrode, electrically contacts the first electrode, and
wherein the two connection lines electrically contacting the same electrode form the first temperature sensor in the form of the first thermocouple and a second temperature sensor in the form of a second thermocouple.

7. The device as claimed in claim 6, further comprising:
a third temperature sensor having a fifth connection line for electrical contacting of the third temperature sensor, which third temperature sensor serves for determining temperature of the liquid.

8. The device as claimed in claim 7,
wherein the third temperature sensor is a resistance element.

9. The device as claimed in claim 7,
wherein the third temperature sensor and the reference element are arranged in a single sensor head.

10. The device as claimed in at least one of claim 7,
wherein the third connection line is embodied as a connecting line that electrically contacts one of the two electrodes and the third temperature sensor.

11. The device as claimed in claim 7,
wherein the third connection line is composed of the same material as the fifth, the first, or the second connection line.

12. A method for in-situ calibration and/or validation of a temperature measuring device, comprising:
   providing a temperature measuring device, including:
      a first temperature sensor for determining a temperature of a liquid;
      a reference element for in-situ calibration of the device, wherein the reference element is composed at least partially of a material in which a phase transformation occurs at a predetermined phase transformation temperature within a temperature range relevant for operation of the device, wherein during the phase transformation the material remains in a solid phase;
      a first connection line for electrical contacting of a first component of the reference element;
      a second connection line for electrical contacting of a second component of the reference element; and
      a third connection line composed of a material which differs from the material of the first or the second connection line,
      wherein the third connection line is arranged such that it forms with the first or the second connection line the first temperature sensor in the form of a first thermocouple;
   ascertaining a phase transformation point in time at which a phase transformation temperature of the reference element is achieved;
   ascertaining a first temperature measured value measured by the first temperature sensor at a first measuring point in time near the phase transformation point in time; and
   calibrating the first temperature sensor based on a comparison of the phase transformation temperature with the first temperature measured value.

13. The method as claimed in claim 12, wherein the device further includes a second temperature sensor, the method further comprising:
   ascertaining a second temperature measured value measured by the second temperature sensor at a second measuring point in time near the phase transformation point in time;
   calibrating the second temperature sensor based on a comparison of the phase transformation temperature with the first and/or second temperature measured value; and
   determining the temperature of the liquid based on the first and/or second temperature measured value or based on an average value of the first and second temperature measured values.

14. The method as claimed in claim 13, wherein the device further includes a third temperature sensor, the method further comprising:
   ascertaining a third temperature measured value measured by the third temperature sensor at a third measuring point in time near the phase transformation point in time;
   calibrating the third temperature sensor based on a comparison of the phase transformation temperature with the first, second and/or third temperature measured value; and
   determining the temperature of the liquid based on the first, second and/or third temperature measured value or based on an average value of the first, second and/or third temperature measured value.

15. The method as claimed in claim 14,
wherein for calibrating the third temperature sensor based on a comparison of the phase transformation temperature with the third temperature measured value, a difference existing between the first and/or second temperature measured value measured by means of the first and/or second temperature sensor is taken into consideration.

* * * * *